US012175894B2

(12) United States Patent
Huffman et al.

(10) Patent No.: US 12,175,894 B2
(45) Date of Patent: Dec. 24, 2024

(54) LAWN SIGN AND ATTACHMENT KIT FOR ATTACHING SIGN

(71) Applicant: Tracer Imaging LLC, Ossining, NY (US)

(72) Inventors: Jessica Huffman, Wilton, CT (US); Ryan Kelly, Scarsdale, NY (US); Steven M. Spiro, Chappaqua, NY (US)

(73) Assignee: TRACER IMAGING LLC, Ossining, NY (US)

( * ) Notice: Subject to any disclaimer, the term of this patent is extended or adjusted under 35 U.S.C. 154(b) by 170 days.

(21) Appl. No.: 17/889,676

(22) Filed: Aug. 17, 2022

(65) Prior Publication Data

US 2023/0062713 A1 Mar. 2, 2023

Related U.S. Application Data

(60) Provisional application No. 63/237,866, filed on Aug. 27, 2021.

(51) Int. Cl.
*G09F 7/18* (2006.01)

(52) U.S. Cl.
CPC ........ *G09F 7/18* (2013.01); *G09F 2007/1843* (2013.01)

(58) Field of Classification Search
CPC .. G09F 19/228; G09F 2007/1843; G09F 7/18; B42F 15/066
See application file for complete search history.

(56) References Cited

U.S. PATENT DOCUMENTS

| | | | | | |
|---|---|---|---|---|---|
| 1,492,552 | A * | 5/1924 | Behrman | G09F 3/12 | 40/669 |
| 1,852,744 | A * | 4/1932 | Engel | B42F 5/06 | 40/778 |
| 2,333,302 | A * | 11/1943 | Enk | G09F 3/206 | 40/658 |
| 2,608,014 | A * | 8/1952 | Bennett | G09F 7/02 | 40/618 |
| 3,239,957 | A * | 3/1966 | Snediker | G09F 17/00 | 116/63 R |
| 3,334,736 | A * | 8/1967 | Cole | A47G 25/50 | 206/820 |
| 3,350,804 | A * | 11/1967 | Guyer, Jr. | G09F 1/14 | 40/594 |
| 3,889,409 | A * | 6/1975 | Thomas | G09F 1/14 | 40/607.04 |

(Continued)

*Primary Examiner* — David R Dunn
*Assistant Examiner* — Christopher E Veraa
(74) *Attorney, Agent, or Firm* — Leason Ellis LLP

(57) ABSTRACT

A lawn sign attachment kit for attaching a sign to a sign frame. The kit includes a pair of adhesive connectors. Each adhesive connector includes a first end portion having a first width; a second end portion having a second width and an intermediate waist portion having a third width that is less than the first width and the second width. The adhesive connector has an inner face and an opposing outer face. The adhesive connector includes an integral finger that extends laterally outward from the second end portion. The adhesive connector having a first adhesive strip disposed transversely across the first end portion and a second adhesive strip disposed transversely across the second end portion and the integral finger.

14 Claims, 8 Drawing Sheets

(56) References Cited

U.S. PATENT DOCUMENTS

| | | | | | |
|---|---|---|---|---|---|
| 4,259,803 | A * | 4/1981 | Sittler | G09F 7/18 | 40/607.06 |
| 4,479,318 | A * | 10/1984 | Russell | A47G 1/0633 | 40/788 |
| 4,660,310 | A * | 4/1987 | Farmer | G09F 15/0006 | 40/607.06 |
| 4,722,376 | A * | 2/1988 | Rhyner | G09F 3/203 | 281/31 |
| 4,864,757 | A * | 9/1989 | Lovett | G09F 7/18 | 24/561 |
| 4,946,039 | A * | 8/1990 | Garran | G09F 15/02 | 40/607.05 |
| 5,111,868 | A * | 5/1992 | Sawaya | A47H 13/01 | 4/608 |
| 5,209,353 | A * | 5/1993 | Lehtovaara | G11B 33/0416 | 40/641 |
| 5,415,915 | A * | 5/1995 | Oh | A44B 13/0082 | 428/167 |
| 5,595,010 | A * | 1/1997 | Fuller | G09F 15/0025 | 40/611.11 |
| 5,937,555 | A * | 8/1999 | Query | G09F 7/00 | 40/610 |
| 6,397,451 | B1 * | 6/2002 | Gill | G09F 7/12 | 40/586 |
| 6,725,590 | B1 * | 4/2004 | Slusher | G09F 21/045 | 40/594 |
| 7,367,147 | B2 * | 5/2008 | Harms | G09F 15/00 | 40/607.05 |
| 7,575,174 | B2 * | 8/2009 | Gordon | G09F 3/0288 | 235/487 |
| 10,111,550 | B2 * | 10/2018 | Fairchild | A47H 1/18 | |
| 11,869,390 | B2 * | 1/2024 | Perpetua | B41J 11/58 | |
| 2002/0100856 | A1 * | 8/2002 | Hatton | B42F 15/066 | 248/205.3 |
| 2006/0059750 | A1 * | 3/2006 | Schwat | G09F 1/06 | 40/607.03 |
| 2009/0119961 | A1 * | 5/2009 | Harms | G09F 15/0025 | 40/607.05 |
| 2011/0197480 | A1 * | 8/2011 | Nasiatka | G09F 15/00 | 40/594 |
| 2014/0033584 | A1 * | 2/2014 | Falkner | B60R 13/105 | 40/200 |
| 2022/0343805 | A1 * | 10/2022 | Harms | G09F 7/18 | |

* cited by examiner

LAWN SIGN AND ATTACHMENT KIT FOR ATTACHING SIGN

CROSS REFERENCE TO RELATED APPLICATION

The present application claims priority to and the benefit of U.S. patent application Ser. No. 63/237,866, filed Aug. 27, 2021, which is hereby expressly incorporated by reference in its entirety.

TECHNICAL FIELD

The present application relates to lawn signs and more particularly to an attachment kit for attaching a lawn sign to a lawn sign frame.

BACKGROUND

Lawn signs are used in many different settings and for different purposes. In general, a lawn sign holds a sign and is configured to be implanted into the ground (the yard). Some uses of a lawn sign are to celebrate a birthday or graduation or display an allegiance to a sport's team. In addition, lawn signs are heavily used in political campaigns. In particular, lawn signs are often also placed near polling places on election day. Signs come in various shapes and sizes but are most often rectangular and between 12 and 40 inches on each side. They are usually produced in packages that include lawn sign wires since most of these lawn signs need to be placed on a grass or dirt surface.

SUMMARY

A lawn sign attachment kit for attaching a sign to a sign frame. The kit includes a pair of adhesive connectors. Each adhesive connector includes a first end portion having a first width; a second end portion having a second width and an intermediate waist portion having a third width that is less than the first width and the second width. The adhesive connector has an inner face and an opposing outer face. The adhesive connector includes an integral finger that extends laterally outward from the second end portion. The adhesive connector having a first adhesive strip disposed transversely across the first end portion and a second adhesive strip disposed transversely across the second end portion and the integral finger.

In another embodiment, a lawn sign attachment kit for attaching a sign to sign frame includes a pair of adhesive connectors. Each adhesive connector has a first portion connected to a second portion by a first elongated bridge section and to a third portion by a second elongated bridge. A longitudinal axis of the first elongated bridge intersects a longitudinal axis of the second elongated bridge within the first portion and the longitudinal axis of the first elongated bridge is perpendicular to a longitudinal axis of the second elongated bridge. An adhesive layer is disposed along an inner face of the adhesive connector and is covered by a removable release layer. A width of the first elongated bridge and the second elongated bridge is less than a width of each of the first portion, the second portion and the third portion. The adhesive connector is formed of a flexible material that allows each of the second portion and the third portion to be folded over on top of the first portion.

BRIEF DESCRIPTION OF THE DRAWING FIGURES

DETAILED DESCRIPTION OF CERTAIN EMBODIMENTS

Figure 1:
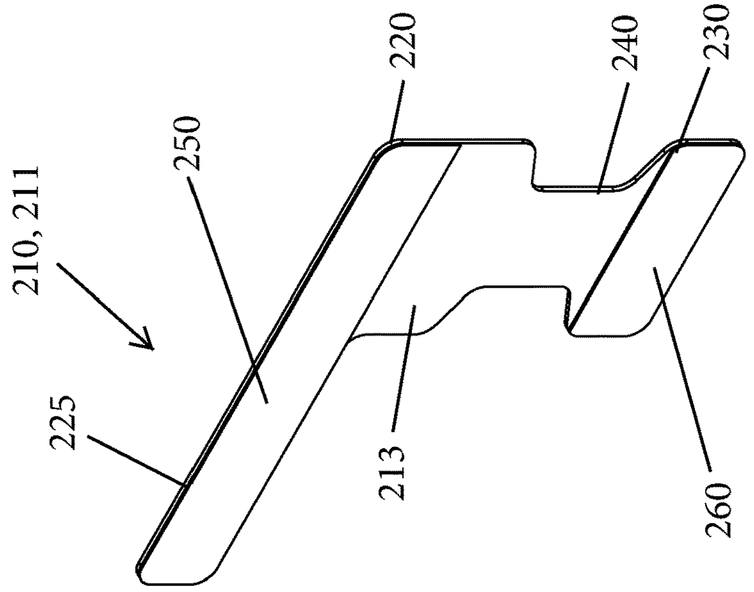
FIG. 1 is a perspective view of an adhesive connector according to a first embodiment configured to attach a sign to a lawn sign frame.
Figure 2:
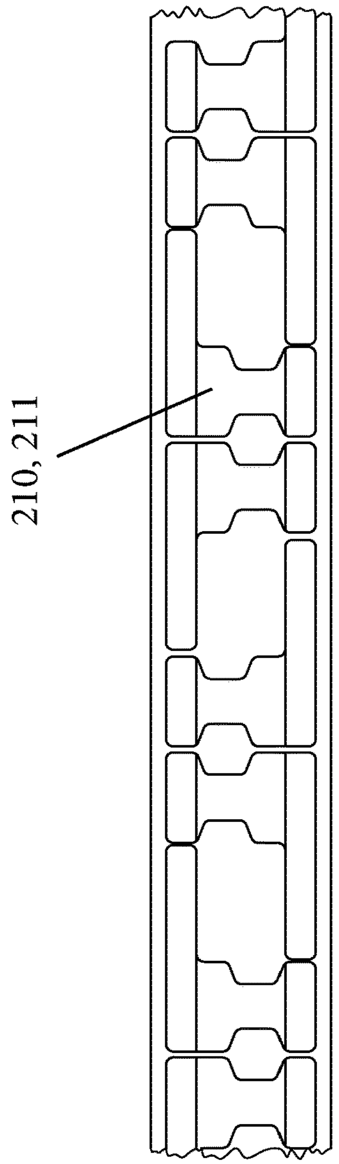
FIG. 2 shows a strip of adhesive connectors with a release liner.
Figure 3:
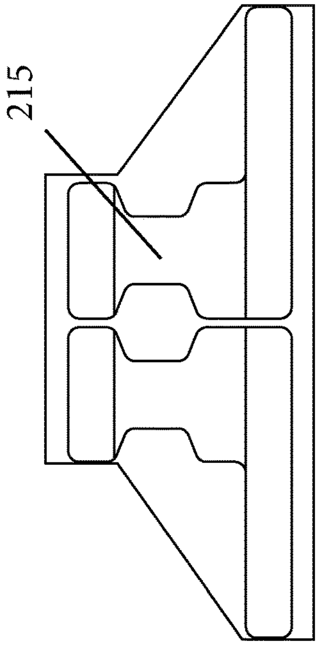
FIG. 3 shows a pair of adhesive connectors, according to the first embodiment, common release liner that can be part of a sign attachment kit.
Figure 4:
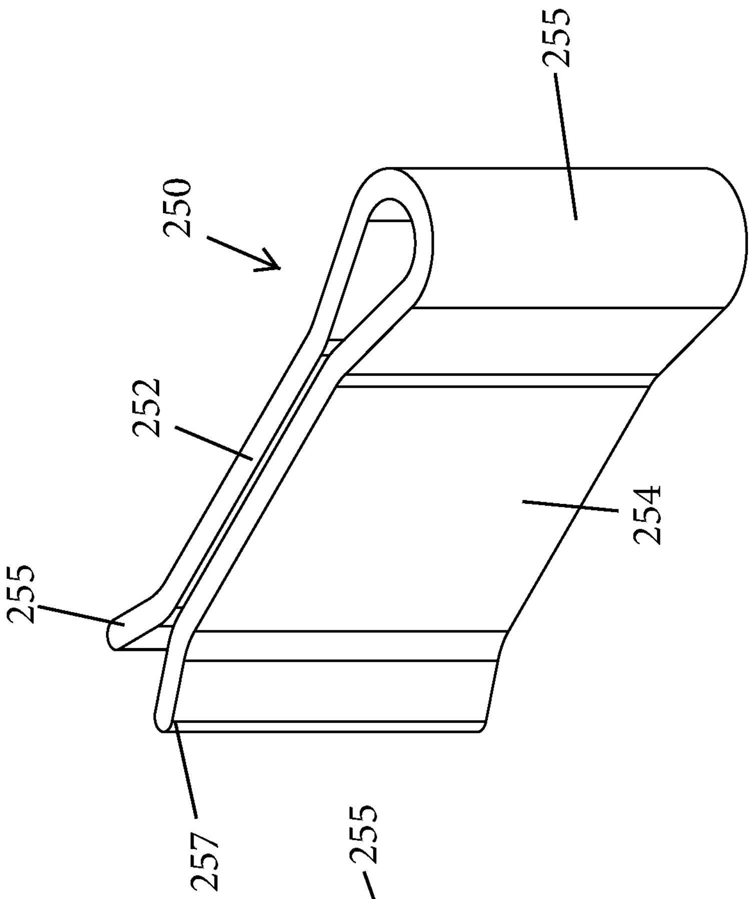
FIG. 4 is a perspective view of a clip.
Figure 5:
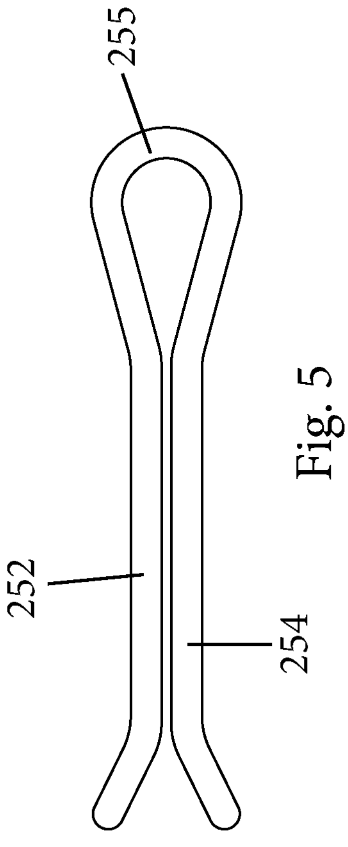
FIG. 5 is side elevation view of the clip.
Figure 7:
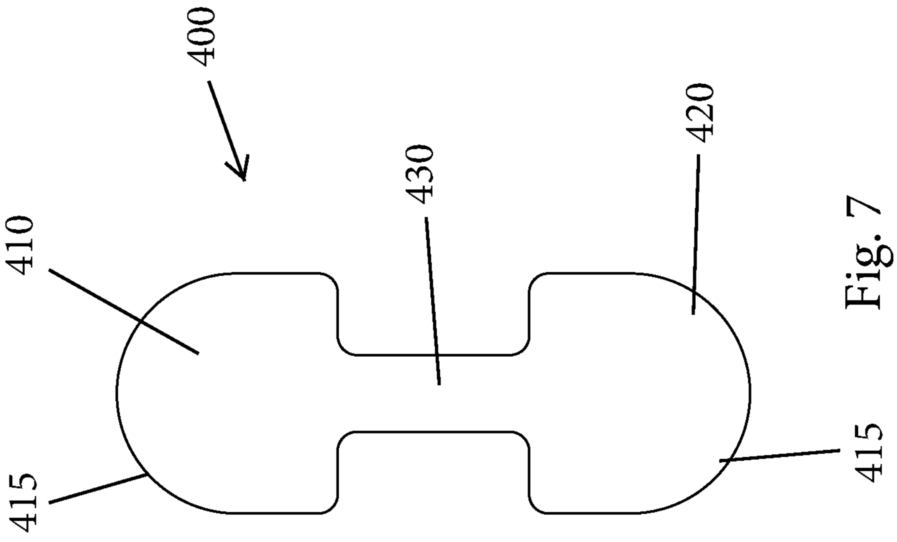
FIG. 7 is a front elevation view of a secondary adhesive connector.

FIGS. 1-5, 8 and 18 illustrate one exemplary lawn (yard) sign 100. The lawn sign 100 generally is formed of a sign (substrate) 110; a sign frame 120 and an attachment kit 200 for attaching the sign 110 to the sign frame 120.

The sign 110 can be formed from any number of different materials that are suitable for the intended application. In one embodiment, the sign 110 is formed of a foldable material and more particularly, is formed of a material that can be folded on top of itself. The sign 110 can have a rectangular shape with a first half 116 and a second half 118. The sign 110 is of a type that can be folded in half to define a folded top section 112 (in its folded state) and a pair of free edges that represent the two ends of the unfolded sign 110. The folded top section 112 represents the middle section of the sign in its unfolded, flat state. Typically, the sign 110 has a parallelogram shape. The sign 110 has a first corner 111, a second corner 113, a third corner 115, and a fourth corner 117.

In one embodiment, the sign 110 is formed of a fabric material (e.g., canvas) that withstand the elements (outdoor environment).

Figure 16:
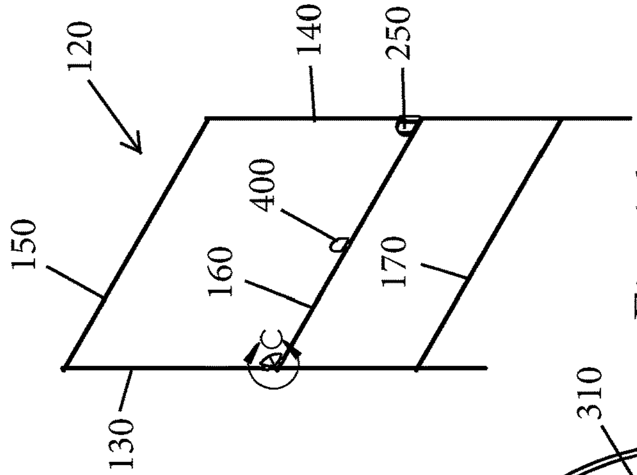
FIG. 16 is a side perspective view of the lawn sign frame of FIG. 14.
Figure 17:
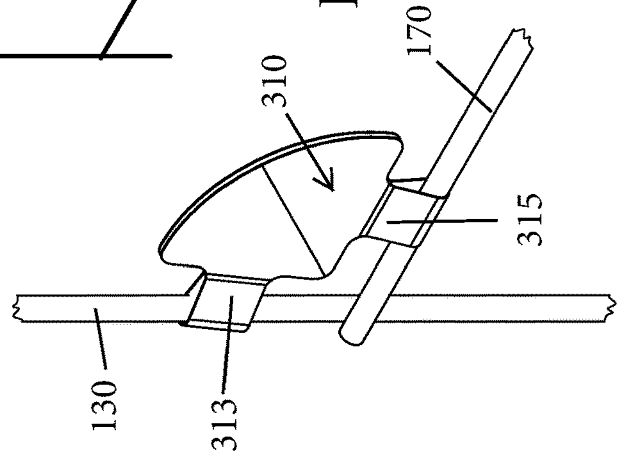
FIG. 17 is a closeup of detail C of FIG. 16 showing one adhesive connector of FIG. 6 attached to the one corner.
Figure 15:
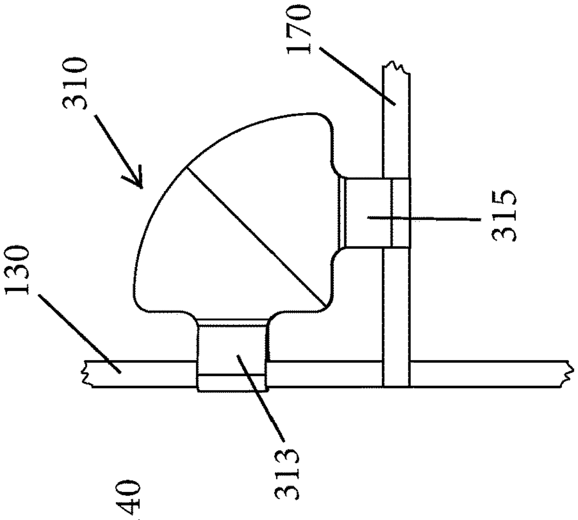
FIG. 15 is a closeup of detail A of FIG. 14 showing one adhesive connector of FIG. 6 attached to one corner.
Figure 14:
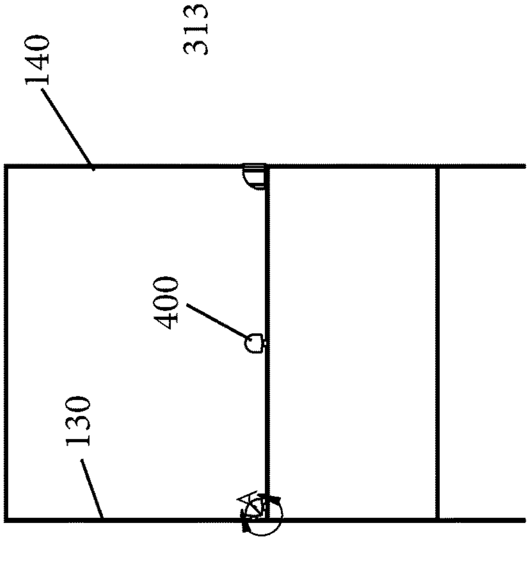
FIG. 14 is a front elevation view of the lawn sign frame with no sign illustrating attachment of two adhesive connectors of FIG. 6 in two corners and attaching of one second adhesive connector.
Figure 18:
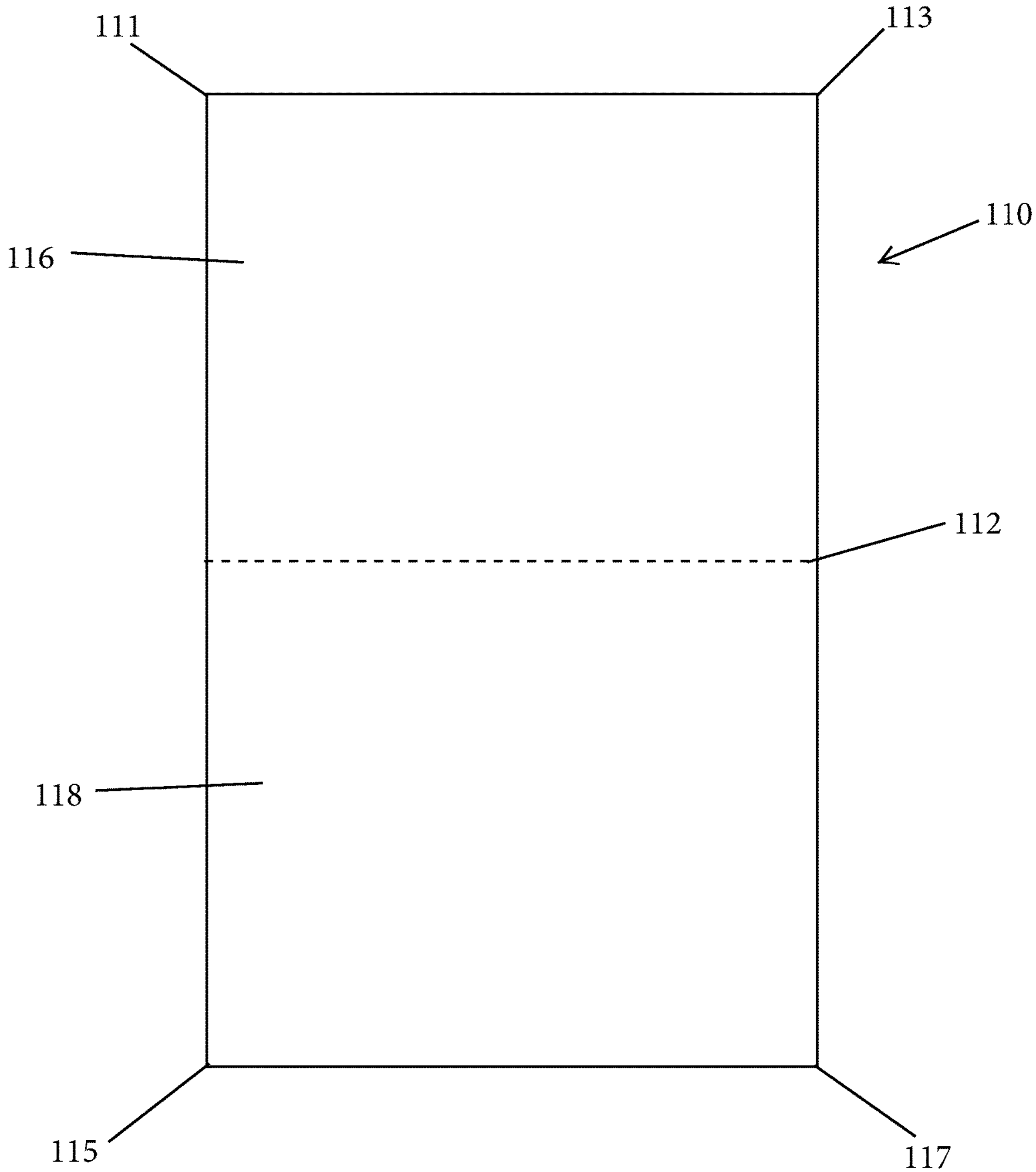
FIG. 18 is a front elevation view of the sign in an unfolded, flat state

As shown in FIG. 16, the sign frame 120 can have any number of different shapes and sizes. One common type of lawn sign frame is an "H-frame". This type of frame is defined by a left frame member or left rail or tine 130 and a right frame member or right rail or tine 140. One or more crossbars are located between the left tine 130 the right tine 140 and more particularly, the illustrated sign frame 120 contains a first (top) crossbar 150, a second (middle) crossbar 160 and a third (bottom) crossbar 170. The crossbars 150, 160, 170 adds strength and makes the entire frame one single unit. The left tine 130 and the right tine 140 are parallel to one another and the three crossbars 150, 160, 170 are parallel to one another and are oriented perpendicular to the left, tine 130 and the right tine 140.

It will be appreciated that the third crossbar 170 can be eliminated.

The sign frame 120 can be formed of many different materials, such as metals or plastics. The various parts of the frame are attached using traditional techniques, such as welding, etc.

Referring to FIGS. 1-5, 16 and 18, the attachment kit 200 is configured to attach the sign 110 to the sign frame 120. The attachment kit 200 includes at least one pair of adhesive connectors 210, 211 and at least one pair of clips 250. The attachment kit 200 is designed to attach the sign 110 in its folded state to the sign frame 120. In particular, the sign 110 is intended to be folded over the first crossbar 150 such that the folded top section 112 is draped over the first crossbar 150 and the two free edges 114 of the sign 110 are positioned near the second crossbar 160. The distance between the first crossbar 150 and the second crossbar 160 is thus generally the size of one half of the sign 110 which can also be considered to be one side face of the sign 110. The sign 110 is typically configured such that in the folded state, the two side faces that face in opposite directions contain graphic matter.

The sign 110 with its two free edges 114 which represent a top edge and a bottom edge in the unfolded state. The sign 110 has a first corner 111, a second corner 113, a third corner 115 and a fourth corner 117.

The adhesive connector 210 is used on one side of the sign frame 110 and the adhesive connector 211 is used on the other side of the sign frame 110. For example, the adhesive connector 210 can be considered to be a left adhesive connector 210 and the adhesive connector 211 can be considered to be a right adhesive connector 211.

The adhesive connector 210 is used to attach the first corner 111 to the third corner 115 and the adhesive connector 211 is used to attach the second corner 113 to the fourth corner 117 as described below.

Each adhesive connector 210, 211 is defined by a first end portion 220, an opposing second end portion 230 and an intermediate portion 240. The first end portion 220 and the second end portion 230 are defined by a first width and the intermediate portion 240 comprises a narrow waist between the first end portion 220 and the second end portion 230. The intermediate portion 240 is defined by a second width that is less than the first width. The adhesive connector 210, 211 has a first face (first side) 213 and an opposing second face (second side) 215.

The first end portion 220 has an arm or finger 225 that extends laterally from the main section of the first end portion 220. The finger 225 is flexible like the main body.

The main body of the adhesive connector 210, 211 is formed of a suitable material, such as PET (polyester) film or other flexible plastic.

The adhesive connector 210, 211 has a first adhesive strip 250 adhered thereto and has a second adhesive strip 260 adhered thereto. The first adhesive strip 250 has a first length and the second adhesive strip 260 has a second length that is shorter than the first length. Both the first adhesive strip 250 and the second adhesive strip 260 are elongated structures.

The first adhesive strip 250 and the second adhesive strip 260 can be in the form of double sided adhesive tape with release liners or covers.

Each of the first adhesive strip 250 and the second adhesive strip 260 are adhered to the first face 213. The first adhesive strip 250 extends across the first end portion 220 adjacent the free edge 114 and across the finger 225. The second adhesive strip 260 extends across the second end portion 230 adjacent the free edge 114, The first and second adhesive strips 250, 260 extend parallel to one another.

As shown in the figures, the adhesive connectors 210, 211 can be provided on a common sheet with the two connectors 210, 211 being arranged in a compact footprint.

The clip 250 is a flexible structure that has a first leg 252 and an opposing second leg 254 with a curved connector end portion 255 that connects the first leg 252 and the second leg 254. The first leg 252 terminates in a flared end 255 and similarly, the second leg 254 terminates in a flared end 257. The clip 250 can be formed of any number of suitable materials including plastics that allow the two legs 252, 254 to be separated.

Method of Assembly

The method of assembly the lawn sign consists of the following steps.

First, the sign 110 is folded over the first crossbar 150 such that the folded top section 112 is draped over the first crossbar 150 and the two free edges 114 of the sign 110 are positioned near the second crossbar 160. In this position, the first corner 111 and the third corner 115 overlap and the second corner 113 and the fourth corner 117 overlap. The adhesive connector 210 is used to attach the first corner 111 to the third corner 115 and the adhesive connector 211 is used to attach the third corner 115 to the fourth corner 117.

Second, the second end portion 230 is affixed to the first corner 111 by removing the release liner and then pressing the exposed second adhesive strip 260 against an outer facing surface of the first corner 111. When the second end portion 230 is affixed to the first corner 111, the intermediate portion 240 (narrow waist) is draped over the second crossbar 160 with the first end portion 220 and the finger 225 being free and lying below the second crossbar 160.

The adhesive strips 250, 260 can be formed of any number of suitable adhesive materials, such as acrylic adhesive. As shown, a release liner can protect the adhesive material until use.

Third, the sign frame can be turned over or spun around and the adhesive connector 210 is folded over at the intermediate portion 240 so as to position the first end portion 220 relative to (adjacent) an outer surface of the third corner 115.

Fourth, the release liner of the first adhesive strip 250 is removed or was previously removed in step two when a common release liner is used and then the exposed first adhesive strip 250 that lies over the first end portion 220 is pressed into contact with the outer surface of the third corner 115. This attachment results in the first corner 111 being attached to the third corner 115 about the second crossbar 160. The finger 225 extends laterally beyond the left tine 130.

Fifth, the finger 225 is then folded back towards the first corner 111 resulting in the finger 225 being folded over the left tine 130 and is then adhesively attached to the outer surface of the first corner 111. As shown, the adhesive connector 210 is configured such that when the finger 225 is folded back over the left tine 130, the finger 225 is disposed adjacent the free edge of the second end portion 230. However, the finger 225 is not meant to overlap the second end portion 230 but instead meant to be positioned next to the second end portion 230. It will be appreciated that the finger 225 applies lateral tension and also prevents the sign from sliding off of the sign frame since the finger 225 is adhesively attached to the left tine 130.

The process is repeated for the adhesive connector 211.

More particularly, in a sixth step, the second end portion 230 of the adhesive connector 211 is affixed to the second corner 113 by removing the release layer and then pressing the exposed second adhesive strip 260 against an outer facing surface of the second corner 113. When the second end portion 230 of the adhesive connector 211 is affixed to the second corner 113, the intermediate portion 240 (narrow waist) is draped over the second crossbar 160 with the first end portion 220 and the finger 225 being free and lying below the second crossbar 160.

Seventh, the sign frame can be turned over and the adhesive connector 211 is folded over at the intermediate portion 240 so as to position the first end portion 220 relative to an outer surface of the fourth corner 117.

Eighth, the release liner of the first adhesive strip 250 is removed and then the exposed first adhesive strip 250 that lies over the first end portion 220 is pressed into contact with the outer surface of the fourth corner 117. This attachment results in the second corner 113 being attached to the fourth corner 117 about the second crossbar 160. The finger 225 extends laterally beyond the right tine 140.

Ninth, the finger 225 is then folded back towards the second corner 113 resulting in the finger 225 being folded over the right tine 140 and is then adhesively attached to the outer surface of the second corner 113. As shown, the adhesive connector 210 is configured such that when the finger 225 is folded back over the right tine 140, the finger 225 is disposed adjacent the free edge of the second end portion 230. However, the finger 225 is not meant to overlap the second end portion 230 but instead meant to be positioned next to the second end portion 230. It will be appreciated that the finger 225 applies lateral tension and also prevents the sign from sliding off of the sign frame since the finger 225 is adhesively attached to the right tine 140.

When assembled, the sign 110 is under tension and is securely attached to and supported by the sign frame 120.

In a tenth step, the clips 250 are fitted over the adhesive connectors 210, 211. The two legs 253. 254 of each clip 250 are separated and then the clip 250 is slid over one of the adhesive connectors 210, 211 with the curved connector end portion 255 being disposed adjacent the respective left tine or right tine. The width of each leg 253, 254 is the same or similar or at least less than the height of each of: (1) the second end portion 230 and (2) the height of the combined first end portion 220 and the finger 225 disposed abutting one another. The clips 250 provide additional attachment and cover the adhesive connectors 210, 211.

Attachment Kit (FIGS. 8-18)

An attachment kit, which is similar to attachment kit 200, is configured to attach the sign 110 to the sign frame 120. The attachment kit includes at least one pair of adhesive connectors 310 and a secondary adhesive connector 400 and optionally, at least one pair of the clips 250. The attachment kit 300 is designed to attach the sign 110 in its folded state to the sign frame 120. In particular, the sign 110 is intended to be folded over the first crossbar 150 such that the folded top section 112 is draped over the first crossbar 150 and the two free edges 114 of the sign 110 are positioned near the second crossbar 160. The distance between the first crossbar 150 and the second crossbar 160 is thus generally the size of one half of the sign 110 which can also be considered to be one side face of the sign 110. The sign 110 is typically configured such that in the folded state, the two side faces that face in opposite directions contain graphic matter.

Figure 6:
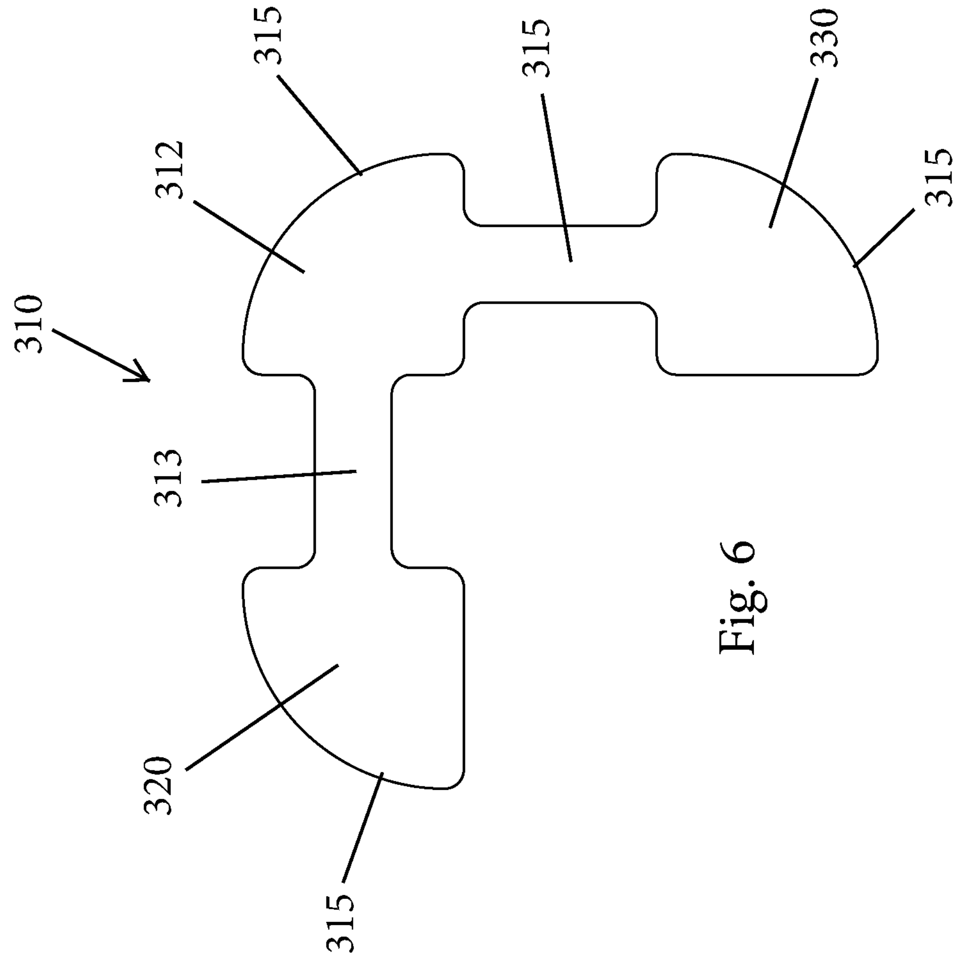
FIG. 6 is a front elevation view of an adhesive connector according to a second embodiment configured to attach a sign to a lawn sign frame.
Figure 8:
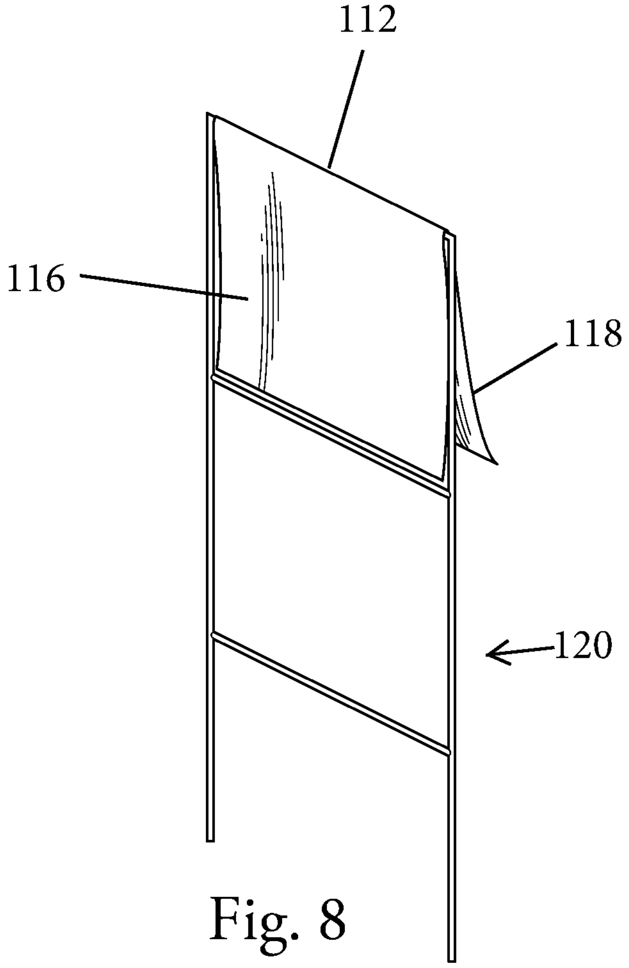
FIG. 8 is a side perspective view of lawn sign frame with a sign being draped therefore for attachment to the lawn sign frame.

The adhesive connector 310 is shown in FIG. 6 in the flat, unfolded state. The adhesive connector 310 includes a first section 312 that is connected to a second section 320 by a first bridge 313 and is connected to a third section 330 by a second bridge 315. The adhesive connector 310 is generally L shaped with the axes of the first bridge 313 and the second bridge 315 being perpendicular to one another. The first, second and third sections 310, 320, 330 can have the same shape and in particular, in the illustrated embodiment, each of these sections 310, 320, 330 has a quadrant shape. An outer edge of each of the sections 310, 320, 330 can have a curved outer edge 315.

Figure 11:
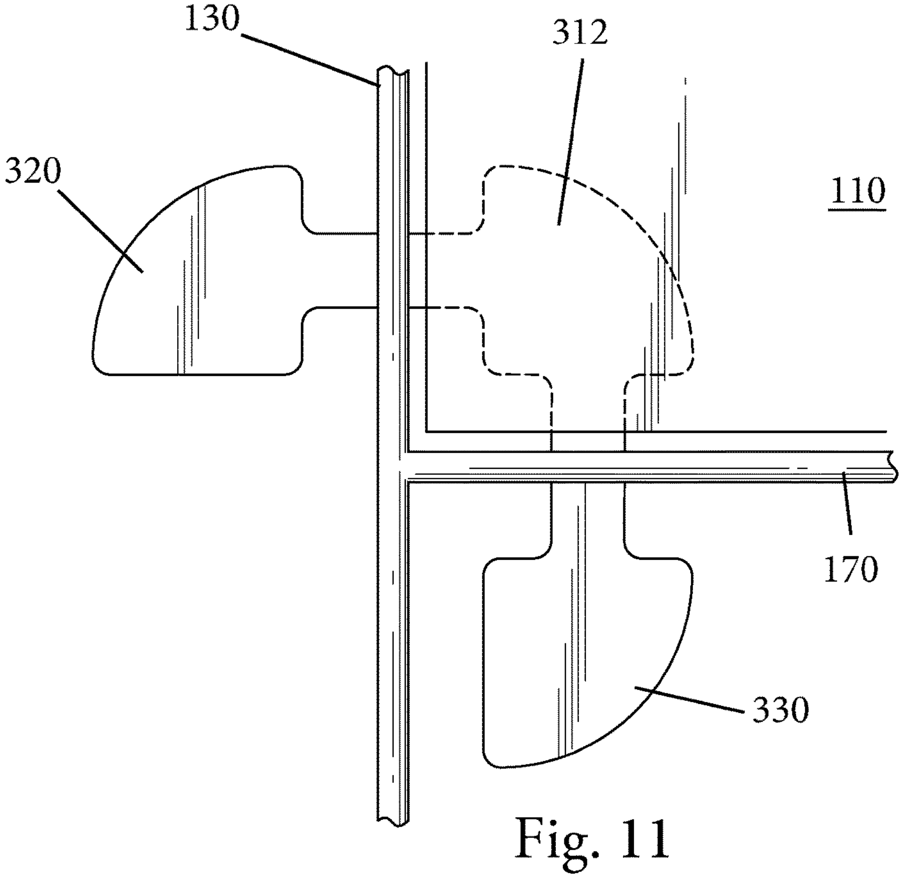
FIG. 11 shows a first step of attaching a first part of the adhesive connector of FIG. 6 to a first side of the sign that is draped over a lawn sign frame.
Figure 12:
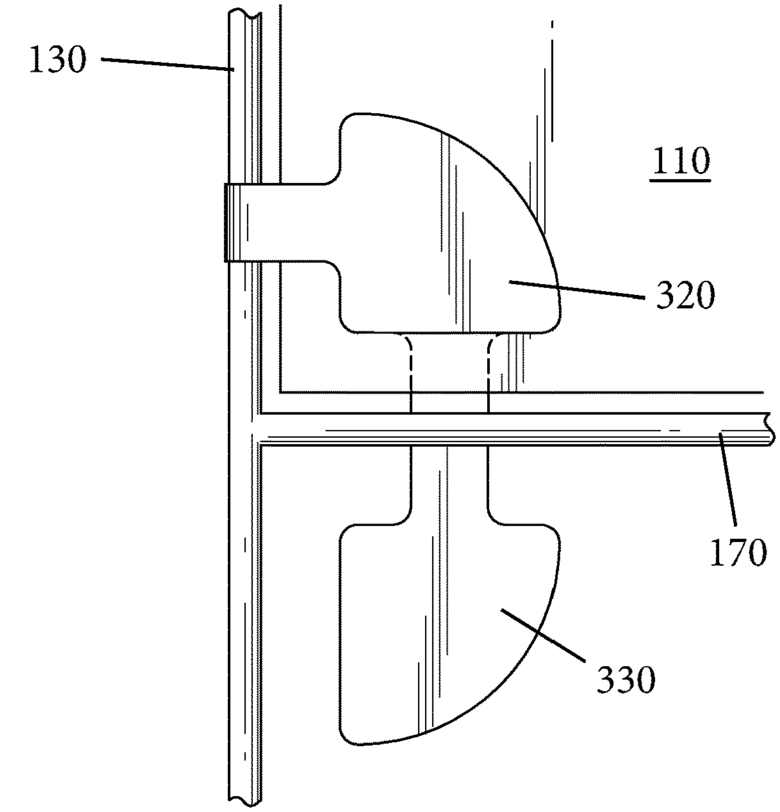
FIG. 12 shows a second step of folding a second part of FIG. 6 and attaching it to a second side of the sign.
Figure 13:
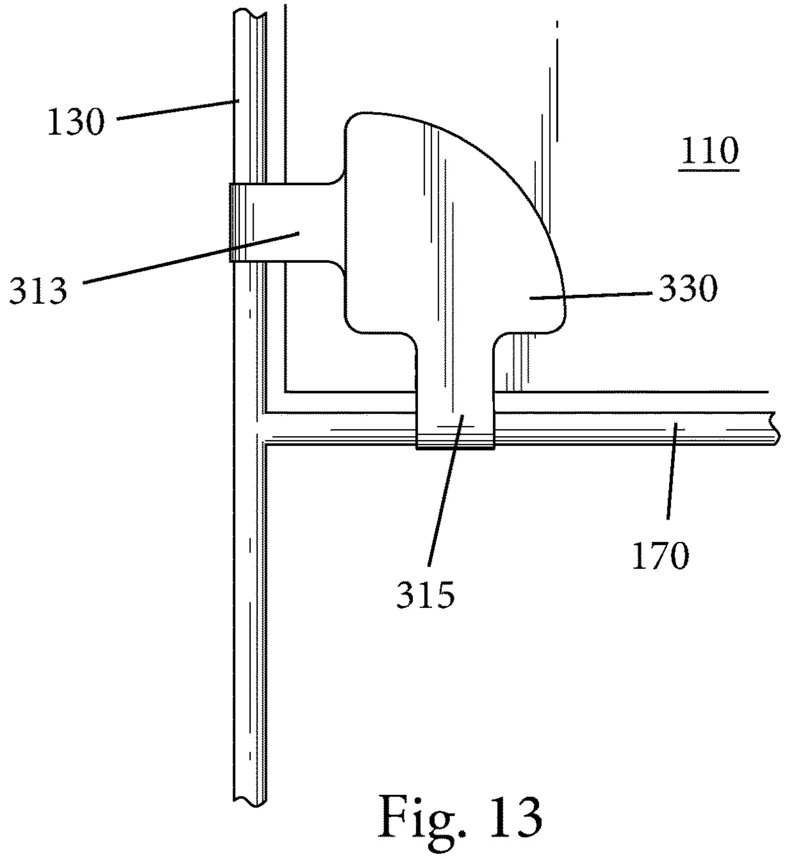
FIG. 13 shows a third step of folding a third part of the adhesive connector and attaching it to the second side of the sign and on top of the second part.

As best appreciated in FIGS. 11-13, the first, second and third sections 310, 320, 330 are oriented such that when folded over on top of one another, they are perfectly superimposed and their outer peripheral edges align. This is true regardless of the folding order.

The main body of the adhesive connector 310 is formed of a suitable material, such as PET (polyester) film or other flexible plastic.

As shown in the flat state of FIG. 6, the adhesive connector 310 has an inner face (inner surface) that is intended to be placed in contact with the sign and includes an outer face (outer surface) that is intended to face away from the sign when installed thereon.

Figure 9:
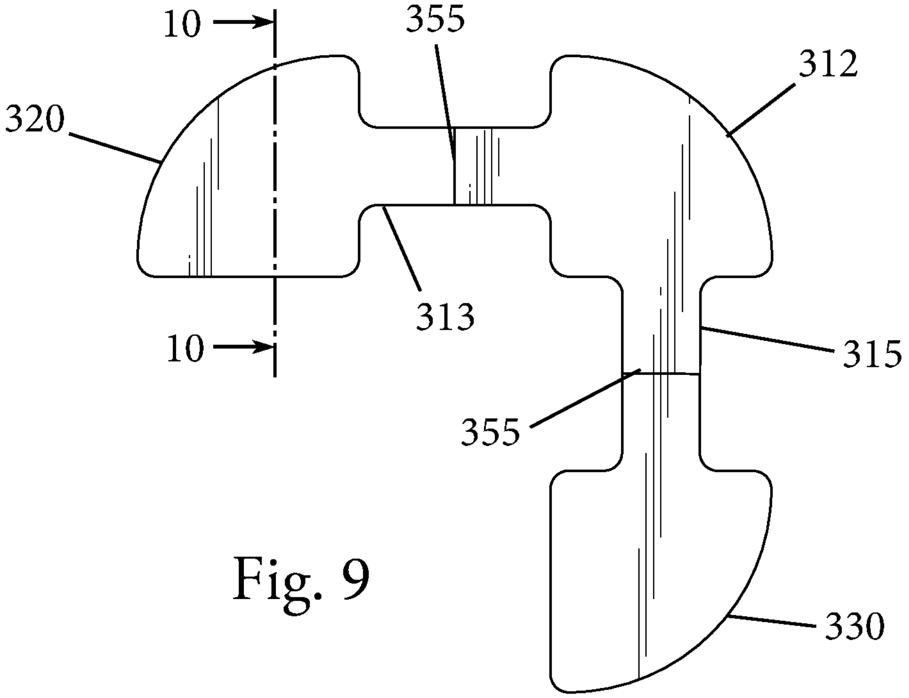
FIG. 9 is a front elevation view of the adhesive connector of FIG. 6 showing a multi-section removable release layer.
Figure 10:
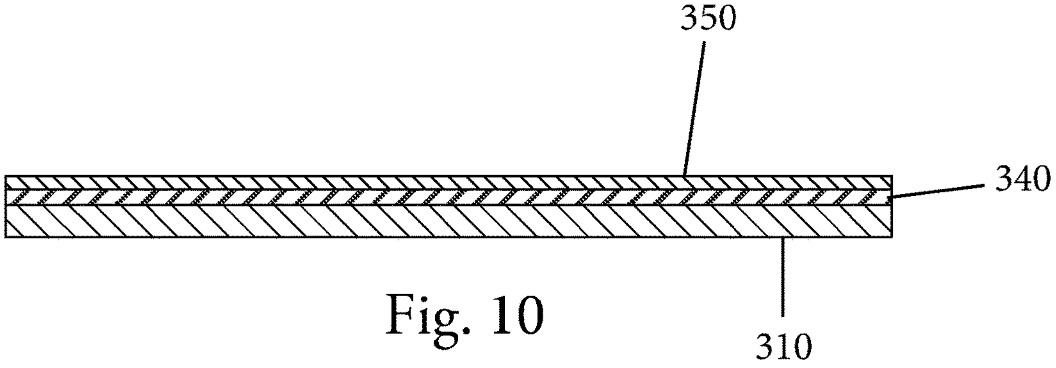
FIG. 10 is a cross-sectional view taken along the line 10-10 in FIG. 9.

The first face of the adhesive connector 310 that is placed into contact with the sign includes an adhesive layer 340 and includes a removable release layer 350 that covers the adhesive layer 340. In one embodiment, the adhesive layer 340 covers the majority of the inner face. In addition, as shown in FIG. 9, the release layer 350 can, instead of being formed as a single continuous structure, consist of three separately removable sections. In FIG. 9, the lines 355 show breaks (abutting edges) of the individual release layer sections 350. In this illustrated embodiment, there are three release layer sections 350 with two breaks 355. In this way, as the adhesive connector 310 is installed, each release layer section 350 is removed individually as that section of the adhesive connector 310 is adhered to the sign.

While in one embodiment, the adhesive can extend along the entire first bridge 313 and the second bridge 315, in another embodiment, only the inner surfaces of the first section 312, second section 320, and the third section 330 can include the adhesive :layer with the first and second bridges 313, 315 being free of adhesive.

Any number of conventional adhesives (e.g., permanent adhesives) and release layers can be used.

As shown, the secondary adhesive connector 400 is defined by a first end portion 410 and a second end portion 420 with a bridge portion 430 connecting the first end portion 410 and the second end portion 420. The bridge portion 430 can also be considered to be a narrow waist between the two end portions 410, 420. The first end portion 410 and the second end portion 420 can have different shapes with the illustrated end portions 410, 420 each having a bullet shape with a curved outer edge 415. One face, namely the inner face, of the secondary adhesive connector 400 includes an adhesive layer with a removable release layer similar to the manner in which the adhesive connector 310 is constructed. The release layer can be bisected with a break line to allow the user to remove the release layer in two discrete sections.

Method of Assembly

The method of assembly the lawn sign consists of the following steps.

The sign 110 is folded over the first crossbar 150 such that the folded top section 112 is draped over the first crossbar 150 and the two free edges 114 of the sign 110 are positioned near the second crossbar 160. In this position, the first corner 111 and the third corner 115 overlap and the second corner 113 and the fourth corner 117 overlap. One adhesive connector 310 is used to attach the first corner 111 to the third corner 115 and another adhesive connector 310 is used to attach the third corner 115 to the fourth corner 117.

The one adhesive connector 310 is prepared by removing the release layer on the first section 312 and then pressing the first section 310 into contact with an outer surface of the first corner 111.

Next either the second section 320 or the third section 330 is prepared for affixation to the third corner 115. It will be appreciated either: (1) the second section 320 can be first folded over and affixed to the outer surface of the third corner 115 and then the third section 330 can be folded over an affixed to the third corner 115 (e.g., as by being affixed to the second section 320 or (2) the third section 330 can be first folded over and affixed to the outer surface of the third corner 115 and then the second section 320 can be folded over an affixed to the third corner 115 (e.g., as by being affixed to the third section 330). During these folded steps, the first bridge 313 wraps around and is adhered to the left tine 130 and the second bridge 315 wraps around and is adhered to the second (middle) crossbar 160. In this way, the overlapping first corner 111 and the third corner 115 are securely attached to the sign and the sign frame, thereby securing the sign to the sign frame.

It will also be appreciated that the above step can be reversed in that the first section 312 can be attached to the third corner 115 and the second and third sections 320, 330 can be attached to the first corner 111.

The process is repeated for the opposite side of the sign and lawn sign frame. More particularly, the other adhesive connector 310 is prepared by removing the release layer on the first section 312 and then pressing the first section 310 into contact with an outer surface of the second corner 113.

Next either the second section 320 or the third section 330 is prepared for affixation to the fourth corner 117. It will be appreciated either: (1) the second section 320 can be first folded over and affixed to the outer surface of the fourth corner 117 and then the third section 330 can be folded over an affixed to the fourth corner 117 (e.g., as by being affixed to the second section 320 or (2) the third section 330 can be first folded over and affixed to the outer surface of the fourth corner 117 and then the second section 320 can be folded over an affixed to the fourth corner 117 (e.g., as by being affixed to the third section 330). During these folded steps, the first bridge 313 wraps around and is adhered to the right tine 140 and the second bridge 315 wraps around and is adhered to the second (middle) crossbar 160. In this way, the overlapping second corner 113 and the fourth corner 117 are securely attached to the sign and the sign frame, thereby securing the sign to the sign frame.

It will also be appreciated that the above step can be reversed in that the first section 312 can be attached to the fourth corner 117 and the second and third sections 320, 330 can be attached to the second corner 113.

The optional secondary adhesive connector 400 is used to attach a middle portion of the sign to the frame. As shown in FIG. 16, the first end portion 410 is adhesively affixed to one side of the sign and then is draped under the second crossbar 160 and the second end portion 420 is folded up and is adhesively affixed to the other side of the sign. The secondary adhesive connector 400 thus connects the center of the sign to the wire frame to help stabilize it.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A lawn sign attachment kit for attaching a sign to a sign frame comprising:

a pair of adhesive connectors, each adhesive connector having a first portion connected to a second portion by a first elongated bridge section and to a third portion by a second elongated bridge, wherein a longitudinal axis of the first elongated bridge intersects a longitudinal axis of the second elongated bridge within the first portion and the longitudinal axis of the first elongated bridge is perpendicular to a longitudinal axis of the second elongated bridge, wherein an adhesive layer is disposed along an inner face of the adhesive connector and is covered by a removable release layer;

wherein a width of the first elongated bridge and the second elongated bridge is less than a width of each of the first portion, the second portion and the third portion;

wherein the adhesive connector is formed of a flexible material that allows each of the second portion and the third portion to be folded over the lawn sign frame and lawn sign.

2. A lawn sign attachment kit for attaching a sign to a sign frame comprising:

a pair of adhesive connectors, each adhesive connector having a first portion connected to a second portion by a first elongated bridge section and to a third portion by a second elongated bridge, wherein a longitudinal axis of the first elongated bridge intersects a longitudinal axis of the second elongated bridge within the first portion and the longitudinal axis of the first elongated bridge is perpendicular to a longitudinal axis of the second elongated bridge, wherein an adhesive layer is disposed along an inner face of the adhesive connector and is covered by a removable release layer;

wherein a width of the first elongated bridge and the second elongated bridge is less than a width of each of the first portion, the second portion and the third portion;

wherein the adhesive connector is formed of a flexible material that allows each of the second portion and the third portion to be folded over the lawn sign frame and lawn sign;

wherein the first portion, the second portion and the third portion have the same shape.

3. The lawn sign attachment kit of claim 2, wherein the first portion has a first quadrant shape, the second portion has a second quadrant shape, and the third portion has a third quadrant shape and each of the first elongated bridge and the second elongated bridge is defined by parallel sides.

4. A lawn sign attachment kit for attaching a sign to a sign frame comprising:

a pair of adhesive connectors, each adhesive connector having a first portion connected to a second portion by a first elongated bridge section and to a third portion by a second elongated bridge, wherein a longitudinal axis of the first elongated bridge intersects a longitudinal axis of the second elongated bridge within the first portion and the longitudinal axis of the first elongated bridge is perpendicular to a longitudinal axis of the second elongated bridge, wherein an adhesive layer is disposed along an inner face of the adhesive connector and is covered by a removable release layer;

wherein a width of the first elongated bridge and the second elongated bridge is less than a width of each of the first portion, the second portion and the third portion;

wherein the adhesive connector is formed of a flexible material that allows each of the second portion and the third portion to be folded over the lawn sign frame and lawn sign;

wherein the second portion has a shape that is a mirror image relative to a shape of the first portion and the third portion has a shape that is a mirror image relative to a shape of the first portion.

5. The lawn sign attachment kit of claim 4, wherein a length of the first elongated bridge is such that when the first elongated bridge is folded at a midpoint thereof, the second portion is completely superimposed over the first portion and a length of the second elongated bridge is such that when the second elongated bridge is folded at a midpoint thereof, the third portion is completely superimposed over the first portion.

6. The lawn sign attachment kit of claim 4, wherein the adhesive connector comprises a single piece of cut material formed of a synthetic material.

7. The lawn sign attachment kit of claim 4, further including a secondary adhesive connector that has a first end portion and an opposite second end portion connected by an elongate bridge, the second end portion having a shape that is a mirror image relative to a shape of the first end portion, wherein an adhesive layer is disposed along an inner face of the secondary adhesive connector and is covered by a removable release layer.

8. The lawn sign attachment kit of claim 4, wherein the adhesive connector is formed of a flexible plastic film.

9. The lawn sign attachment kit of claim 8, wherein the flexible plastic film comprises PET film.

10. The lawn sign attachment kit of claim 4, further including a flexible clip that has a first leg connected to a second leg with the first and second legs being separable, the clip for placement over the adhesive connector.

11. A lawn sign comprising:

a lawn sign having a first corner, a second corner, a third corner, and a fourth corner, wherein when the lawn sign is folded in half, the first corner and the third corner are superimposed and the second corner and the fourth corner are superimposed;

a lawn sign frame; and a pair of adhesive connectors according to claim 4, one adhesive connector attaching the first corner to the third corner and being attached to the lawn sign frame, the other adhesive connector attaching the second corner to the fourth corner and being attached to the lawn sign frame.

12. A method for attaching a sign to a lawn sign frame that includes a left tine and parallel right tine and first and second crossbars connecting the left tine to the right tine, the method comprising the steps of:

folding the sign in half over the first crossbar;

attaching a first portion of a first adhesive connector to an outer surface of a first corner of the sign;

folding the first adhesive connector over the second crossbar and attaching a second portion of the first adhesive connector to an outer surface of a third corner of the sign that is superimposed over the first corner;

folding the first adhesive connector over the left tine and attaching a third portion of the first adhesive connector to outer surface of the third corner of the sign;

attaching a first portion of a second adhesive connector to an outer surface of a second corner of the sign;

folding the second adhesive connector over the second crossbar and attaching a second portion of the second adhesive connector to an outer surface of a fourth corner of the sign that is superimposed over the second corner; and folding the second adhesive connector over the right tine and attaching a third portion of the second adhesive connector to outer surface of the fourth corner of the sign.

13. The method of claim 12, further including the step of:

attaching a first clip over the left tine and the first adhesive connector; and attaching a second clip over the right tine and second adhesive connector.

14. The method of claim 12, wherein each of the first and second adhesive connectors has a first portion connected to a second portion by a first elongated bridge section and to a third portion by a second elongated bridge, wherein a longitudinal axis of the first elongated bridge intersects a longitudinal axis of the second elongated bridge within the first portion and the longitudinal axis of the first elongated bridge is perpendicular to a longitudinal axis of the second elongated bridge, wherein an adhesive layer is disposed along an inner face of the adhesive connector and is covered by a removable release layer;

wherein a width of the first elongated bridge and the second elongated bridge is less than a width of each of the first portion, the second portion and the third portion; and wherein the adhesive connector is formed of a flexible material that allows each of the second portion and the third portion to be folded over on top of the first portion.

* * * * *